United States Patent [19]

Venema

[11] 4,309,871
[45] Jan. 12, 1982

[54] CONTROL APPARATUS FOR CONTROLLING SURGE IN AIR COMPRESSOR-DRIVEN SYSTEM

[75] Inventor: Harry J. Venema, Wheaton, Ill.

[73] Assignee: Borg-Warner Corporation, Chicago, Ill.

[21] Appl. No.: 124,400

[22] Filed: Feb. 25, 1980

Related U.S. Application Data

[63] Continuation-in-part of Ser. No. 847,634, Nov. 1, 1977, abandoned.

[51] Int. Cl.$^3$ ................................. F02C 9/26
[52] U.S. Cl. .................................. 60/39.28 R; 417/43
[58] Field of Search ............ 60/39.03, 39.27, 39.28 R, 60/39.28 P; 417/20, 22, 42, 43

[56] References Cited

U.S. PATENT DOCUMENTS

| | | | |
|---|---|---|---|
| 2,371,889 | 3/1945 | Hermitte | 60/39.03 |
| 3,002,349 | 10/1961 | Arnett et al. | 60/39.28 R |
| 3,006,144 | 10/1961 | Arnett et al. | 60/39.28 R |
| 4,177,649 | 12/1979 | Venema | 417/43 |

Primary Examiner—Louis J. Casaregola
Attorney, Agent, or Firm—James E. Tracy

[57] ABSTRACT

In an air compressor-driven system, wherein compressed air and fuel are combined in a combustion chamber to produce hot gas for driving a turbine which then rotates the air compressor, surge is prevented by sensing an appropriate parameter, such as the flow rate of the compressed air at the compressor discharge outlet, and developing therefrom a feedback signal which varies the fuel flow to the combustion chamber to dynamically vary the compressor speed (and hence capacity) so that the discharge pressure versus discharge flow rate characteristic curve of the compressor always has a negative slope at the operating point, regardless of where that point is located on the curve. By providing a negative slope at all operating conditions, even when operating in the surge region of the pressure-flow plot, the system is incapable of surge. In order to satisfy variable load requirements, the fuel flow is adjusted, in response to the load on the system, to establish the flow rate of the compressed air at the required steady state level, either within or without the surge region.

8 Claims, 11 Drawing Figures

FIG. 1
COMPRESSOR AND LOAD CHARACTERISTIC

TRANSFER FUNCTION K"

$K_t$

LOGIC TRANSFER FUNCTION

FIG. 10
EQUIVALENT LOAD

FIG. 11

CONTROL APPARATUS FOR CONTROLLING SURGE IN AIR COMPRESSOR-DRIVEN SYSTEM

CROSS-REFERENCE TO RELATED APPLICATION

This is a continuation-in-part application of application Ser. No. 847,634, filed Nov. 1, 1977 (abandoned).

BACKGROUND OF THE INVENTION

This invention relates to control apparatus for controlling the operation of an air compressor, in a system driven by the compressor, to avoid stall or surge and to improve efficiency. Surge, surging or stall in an air compressor-driven system is an unstable condition that may occur when, for example, the flow rate of the air through the compressor drops below a given minimum. It is an oscillation or the onset of oscillation in which the flow rate increases and decreases alternately, and the air flow may even reverse its direction through the compressor. Surging causes excessive vibrations and noise, and may cause permanent damage to the air compressor.

Figure 1:
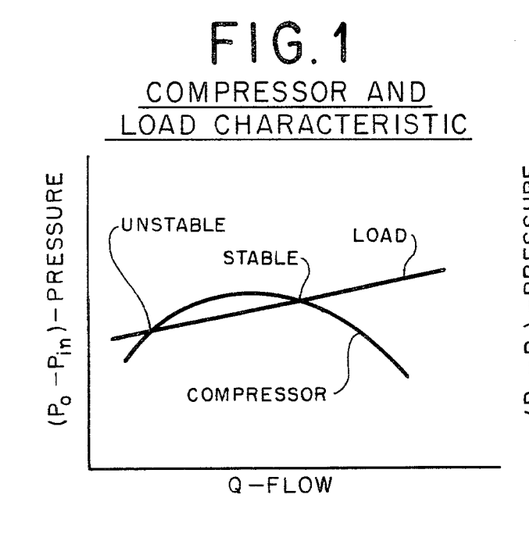
Figure 2:
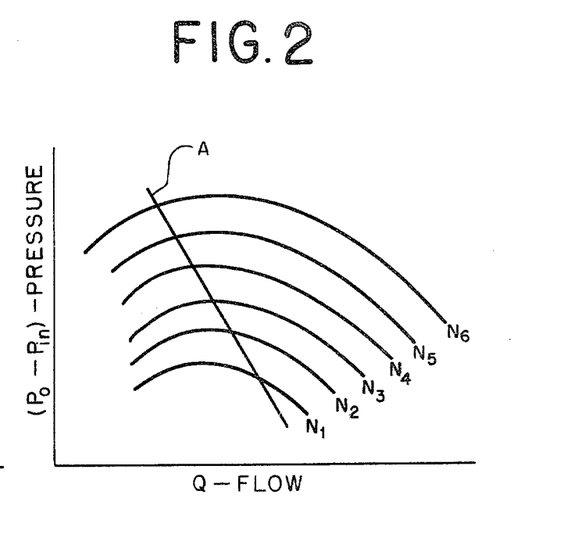
Figure 3:
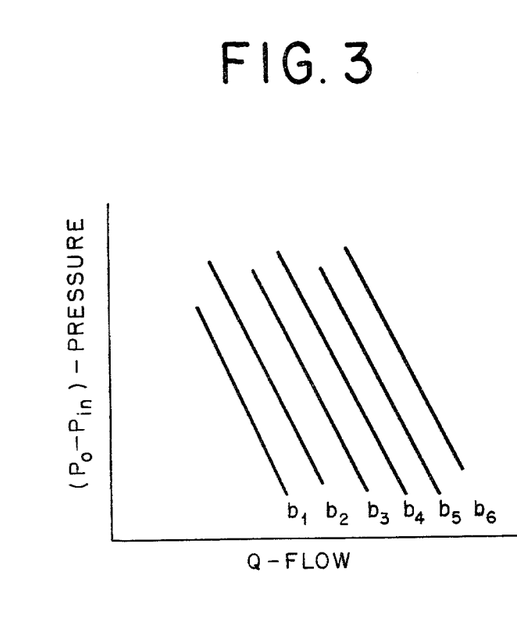

In order to control surge, it is first necessary to understand what causes surge. FIG. 1 in the drawings is a plot of pressure versus flow (Q) for the source (air compressor) and the load (pipes and tank system). It is well known that if the slope of the source is less than the slope of the load, the system will be stable. Thus, it would be well to design a compressor whose slope on the pressure vs. flow plot is always negative and then, because a passive load always has its slope greater than zero, the slope of the source will always be less than the slope of the load. FIG. 2 shows a plot of pressure versus flow for a compressor at various speeds (N) of the compressor. The line A intersects the pressure-flow curves for various speeds. If the flow in the system is measured and the speed is then changed to always remain on line A, the compressor characteristic will always have a slope which is negative. Only flow need be measured because the P versus Q curves for various speeds are known and it is only necessary to set the speed for the flow desired. This is shown in FIG. 3. As the load requires a different operating point, the value of "b" shown in FIG. 3 will be matched to the load.

Figure 4:
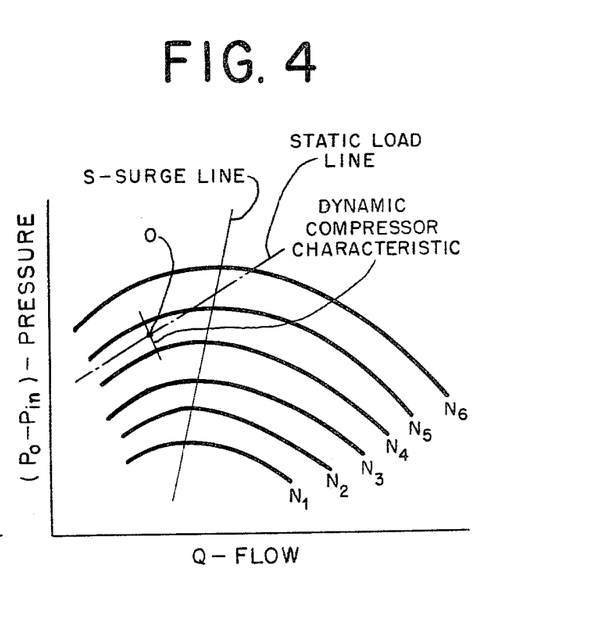

It has thus been described how the compressor curves can be made to always have a negative slope. It is, however, only necessary to have an effective negative slope dynamically, and statically the old characteristics will remain. FIG. 4 shows the compressor characteristic for various speeds. Line S is known as the surge line and connects all of the maxima from the compressor characteristic for the different speeds. The "surge region" is that area to the left of the surge line S and the "non-surge region" is the area to the right. Point O is an operating point within the surge region. By dynamically controlling the speed of the compressor, a negative slope of the pressure versus flow of the compressor about the operating point O can be maintained. Note that the system can be operated stably in what is normally known as the surge region without any accessory system loading means. It will be shown that such a negative slope is always maintained in the system of the present invention and thus the system can actually operate within the surge region and stability will always occur and no surging will take place.

The present invention may be applied to any system having a variable load which is driven by an air compressor, such as a turbine, pump, fan, jackhammer, electric generator, jet engine, etc. It is particularly useful when incorporated in an electric power generating system having a turbine-driven generator and a turbine-driven air compressor and will be described in that environment.

Unfortunately, all of the previous attempts to avoid surge have substantially lessened the efficiency of the air compressor. For example, in one prior control arrangement, when the possibility of surging exists guide vanes at the compressor inlet (usually called prerotation vanes or PRV) are adjusted to throttle the input flow to introduce drag or resistance in an amount sufficient to prevent surging. This changes the load characteristic of the system such that over the desired operating range the net system impedance has a positive resistance. In another control scheme, when a surging condition is approached, gas is bypassed from the compressor discharge to the inlet or is merely passed through a blow-off line. In effect, an additional load is placed on the system such that the impedance of the total system exhibits a net positive resistive component. These prior solutions to the surge problem employ passive and inefficient mechanical mechanisms that dissipate considerable energy. The surge prevention arrangement of the present invention, on the other hand, constitutes a significant improvement over the systems developed heretofore since essentially no energy is needed to keep the air compressor-driven system out of surge. Moreover, additional economies are realized in that the construction of the air compressor may be simplified considerably from that which is usually required.

SUMMARY OF THE INVENTION

The energy-efficient control apparatus of the invention dynamically controls surge in a system wherein an air compressor drives a variable load and wherein compressed air from the compressor is supplied, along with fuel, to a combustion chamber to produce hot gas for driving a turbine which in turn rotates the compressor. The discharge pressure of the compressed air at the compressor outlet varies as a function of the discharge flow rate, the discharge pressure versus flow rate plot being divided into surge and non-surge regions. Load responsive means are provided for adjusting the fuel flow to the combustion chamber to vary the compressor speed (and thus capacity) to establish the flow rate of the compressed air at the steady state operating point needed to satisfy the load demand, the operating point being in either the surge or non-surge region of the pressure-flow plot depending on the load demand. Sensing means senses a predetermined parameter which is subject to substantial variations if surging occurs (such as the compressor output flow) and means, operating in response to the sensing means, develops a feedback signal which is a function of the sensed parameter. Regulating means responds to the feedback signal for varying the fuel flow to the combustion chamber to dynamically change the speed of the compressor to vary the instantaneous operating point, on the compressor's discharge pressure versus flow rate characteristic curve, alternately back and forth around the steady state operating point and to impart a negative slope to the portion of the pressure-flow characteristic curve over which the instantaneous operating point dynamically varies. By effectively forcing the pressure-flow curve to have a negative slope at the operating point, regardless of where that point occurs within or without the surge region, surge is prevented and the operation of the system is stabilized. Hence, by maintaining such a negative slope, surging cannot occur even when operating within what is normally the surge region, the "no-man's land" in all of the prior systems.

DESCRIPTION OF THE DRAWINGS ILLUSTRATING THE INVENTION

The features of the invention which are believed to be novel are set forth with particularity in the appended claims. The invention may best be understood however, by reference to the following description in conjunction with the accompanying drawings in which:

DESCRIPTION OF THE ILLUSTRATED EMBODIMENT

Figure 5:
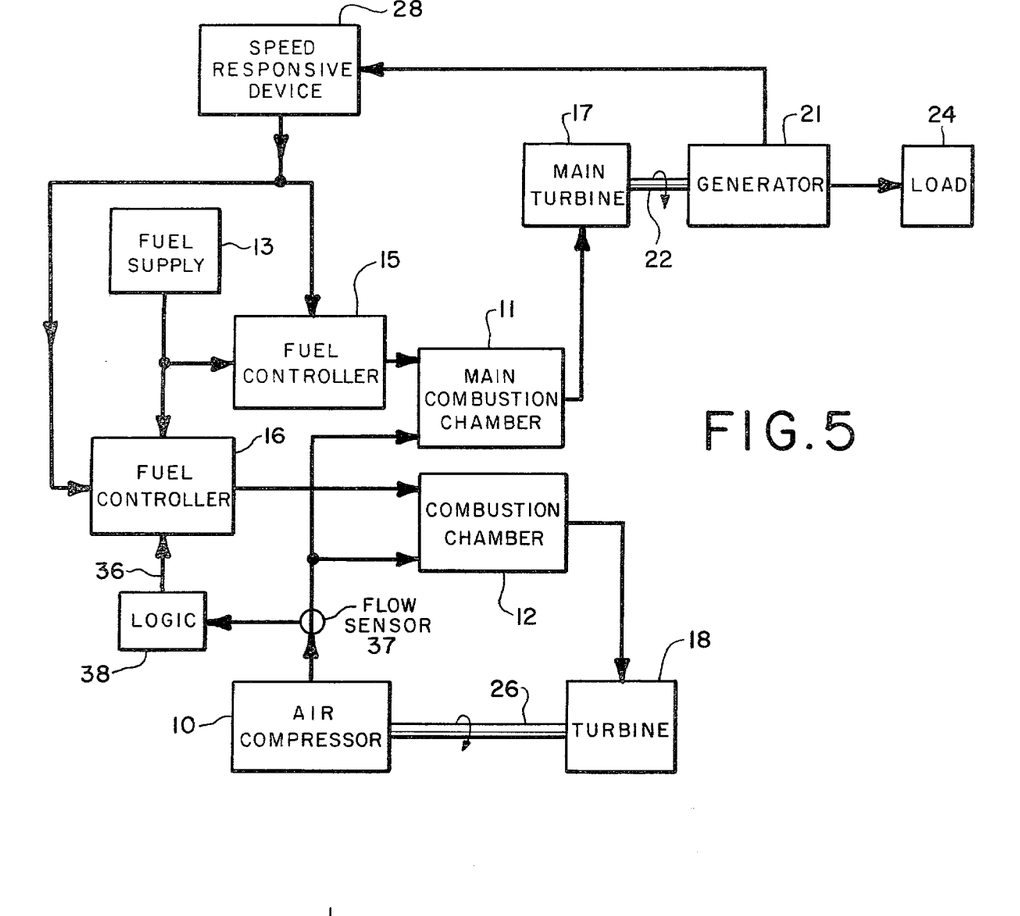
FIG. 5 schematically illustrates, in block diagram form, a control system constructed in accordance with one embodiment of the invention and incorporated in an electric power generating system.

Referring now to FIG. 5, the disclosed power generating system includes an air compressor 10 which supplies compressed air to combustion chambers 11 and 12. An appropriate fuel, such as diesel fuel, is supplied from source 13 and via fuel controllers 15 and 16 to combustion chambers 11 and 12, respectively. Fuel combines with the compressed air and burns in the two combustion chambers to produce hot gas for driving turbines 17 and 18. The invention may be practiced by employing a single turbine whose shaft is connected to the compressor, the turbine and combustion chambers being combined. Generator 21, which comprises rotating machinery, is rotated by turbine 17, by means of shaft 22, and generates electric power to delivery to load 24. Air compressor 10 is rotated by turbine 18 by means of shaft 26.

As is usually the case in a power generating system, the load that must be satisified will vary and if there is no control imposed in response to those load variations the generator speed and load voltage will change as the load changes, which of course is undesirable. Hence, it is preferred to vary the drive on generator 21 in response to and as a function of the load, to the end that the generator speed and output voltage remain substantially constant despite wide variations in the power consumed by load 24. Accordingly, device 28 senses and responds to an operating characteristic of generator 21, such as its speed, to provide a control on each of controllers 15 and 16 to vary the fuel flow to combustion chambers 11 and 12 such that the flow rate of the hot gas supplied to turbine 17 will be at the level required to drive generator 21 at a relatively constant speed. In other words, if the load increases, for example, causing the generator speed to drop below a desired level, speed responsive device 28 effects an increase in the flow rates of the fuel and compressed air to combustion chamber 11 to increase the drive on generator 21 to hold it at the desired speed.

The arrangement of the elements discussed thus far is a known way of producing hot gas for driving a main turbine which in turn rotates a power generator. Of course, the main turbine need not drive a generator and instead could drive, or be a part of, an airplane jet engine, a pump, a fan, etc. Actually, and as will be appreciated, main combustion chamber 11 and main turbine 17, and all of their associated elements, are not necessary to practice the present invention. The invention may be employed in any environment where a turbine-driven air compressor produces compressed air for driving a variable load. For example, the compressed air provided by compressor 10 may operate some pneumatic device, such as a jackhammer. Of course, in the illustrated embodiment the variable load driven by air compressor 10 includes elements 11, 17, 21 and 24.

Consideration will now be given to the invention and how it distinguishes from the prior art. Initially, attention should be directed to FIG. 6 which is a compressor performance diagram (similar to FIG. 4) that depicts a family of five characteristic or performance curves $S_1$–$S_5$ showing the manner in which the discharge pressure (P) of the compressed air in a typical air compressor varies as a function of the flow rate (Q) at the discharge outlet, each of the five curves $S_1$–$S_5$ being the locus of possible operating points for a respective one of five different compressor speeds, curve $S_1$ illustrating the performance at the highest compressor speed. At any given compressor speed, at low flow rates the pressure across the air compressor increases as the flow increases until it reaches a maximum level or crest, whereupon increasing the flow rate causes that pressure to drop. For example, when the air compressor is rotating at its maximum speed, as depicted by curve $S_1$, the discharge pressure increases as the flow rate increases to the point indicated by reference numeral 34. Further increases in flow rate reduces the discharge pressure.

Figure 6:
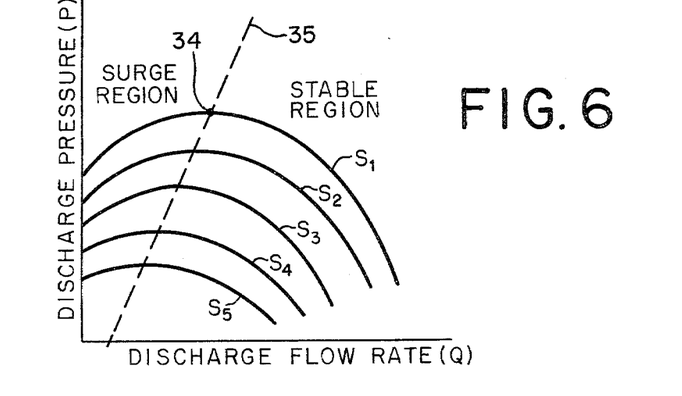
FIG. 6 depicts discharge pressure (P) versus flow rate (Q) characteristic or performance curves that will be helpful in understanding the operation of the surge control system of FIG. 5 and the manner in which that control system distinguishes from the prior art.

Hence, characteristic curve $S_1$ has a positive slope to the left of point 34 and a negative slope to the right of that point. As described previously, an air compressor should be designed so that it never operates on the positive slope portion of its characteristic curve, the positive slope portion effectively constituting a negative resistance area. Otherwise, the compressor may surge. Dashed construction line 35 (the surge line) passes through the crests (or zero slope portions) of each of the five curves and divides the compressor performance diagram into surge and non-surge or stable regions. Until the present invention, to prevent surge an air compressor-driven system was always controlled in one way or another by means of some energy consuming passive device.

The present invention permits operation, without surge and without the use of an energy consuming device, at any point within the compressor performance diagram, including the surge region, and even when the flow rate through the air compressor is very low. This is achieved by dynamically varying the speed of compressor 10, thereby varying its capacity, so that the slope of the discharge pressure versus discharge flow rate characteristic curve is always negative at the operating point, regardless of where that point is located, within or without the surge region. The compressor speed established by speed responsive device 28, in response to the speed of generator 21 (and thus in response to the load demand), determines the steady state operating point on the characteristic curve. Compressor speed variations, and consequently shifting of the steady state operating point, caused by variations of load 24 occur relatively slowly. The dynamic speed changes imposed on compressor 10, in accordance with the invention, occur very fast by comparison and cause the instantaneous operating point to vary alternately back and forth around the steady state operating point, the characteristic curve being effectively purposely shaped, in the range or portion over which the instantaneous operating point varies, to have a negative slope so that surge cannot exist. Dynamically varying the instantaneous operating point around a steady state point may be likened to the manner in which an ac input signal varies or swings around the bias point on the transfer characteristic curve of an amplifier.

To understand the operation of the invention, it is important to realize that surging is basically an oscillation, the equation of an oscillator being:

$$e^{\alpha t} \sin \omega t$$

where $\alpha$ is the attenuation constant. When the exponent $\alpha t$ of the exponential term is positive, the amplitude of the oscillations will increase with time. On the other hand, by making that exponent negative at all times the amplitude of the oscillations will decrease with time. Increasing oscillation amplitude constitutes surge, whereas decreasing oscillation amplitude results in stability. Various feedback arrangements may be provided to insure that the exponent $\alpha t$ is always negative. Preferably, this is accomplished by sensing a predetermined parameter or operating condition which is subject to substantial variations if surging occurs, and developing therefrom a feedback signal, for application to input 36 of fuel controller 16, which is a function of the sensed parameter and will cause the compressor speed (and hence capacity) to vary in such a dynamic fashion that the exponent will be negative, thereby forcing the discharge pressure versus flow rate curve to have a shape such that a negative slope exists at the operating point, even though the operating point may be in the surge region. The sensed parameter may, for example, be the compressor's shaft power, discharge pressure, or discharge flow rate. In the illustrated embodiment, the compressor output flow is monitored by flow sensor 37 which produces a signal representative thereof. The ncessary feedback signal is produced by logic circuitry 38 in response to the output of flow sensor 37.

The feedback signal applied to input 36 varies the fuel supplied to combustion chamber 12 and regulates the compressor speed and capacity on a dynamic basis so that the instantaneous operating point on the pressure-flow curve effectively alternates back and forth around the steady state operating point, the range or portion of the curve over which the instantaneous operating point dynamically varies always having a negative slope so that surging is made impossible and the sensed parameter (compressor discharge flow) is maintained relatively constant to stabilize the operation of the power generating system.

Of course, since the characteristics of the feedback signal depend on the construction of air compressor 10, the make-up of logic circuitry 38 is determined by the particular compressor employed. The construction of the logic circuitry may easily be mathematically determined, however, in accordance with one method, by writing the equations of the pressure drops and flow in the containment circuit through which the air flows, and from these equations the characteristic of the feedback signal, necessary to prevent oscillation, may be found.

Figure 7:
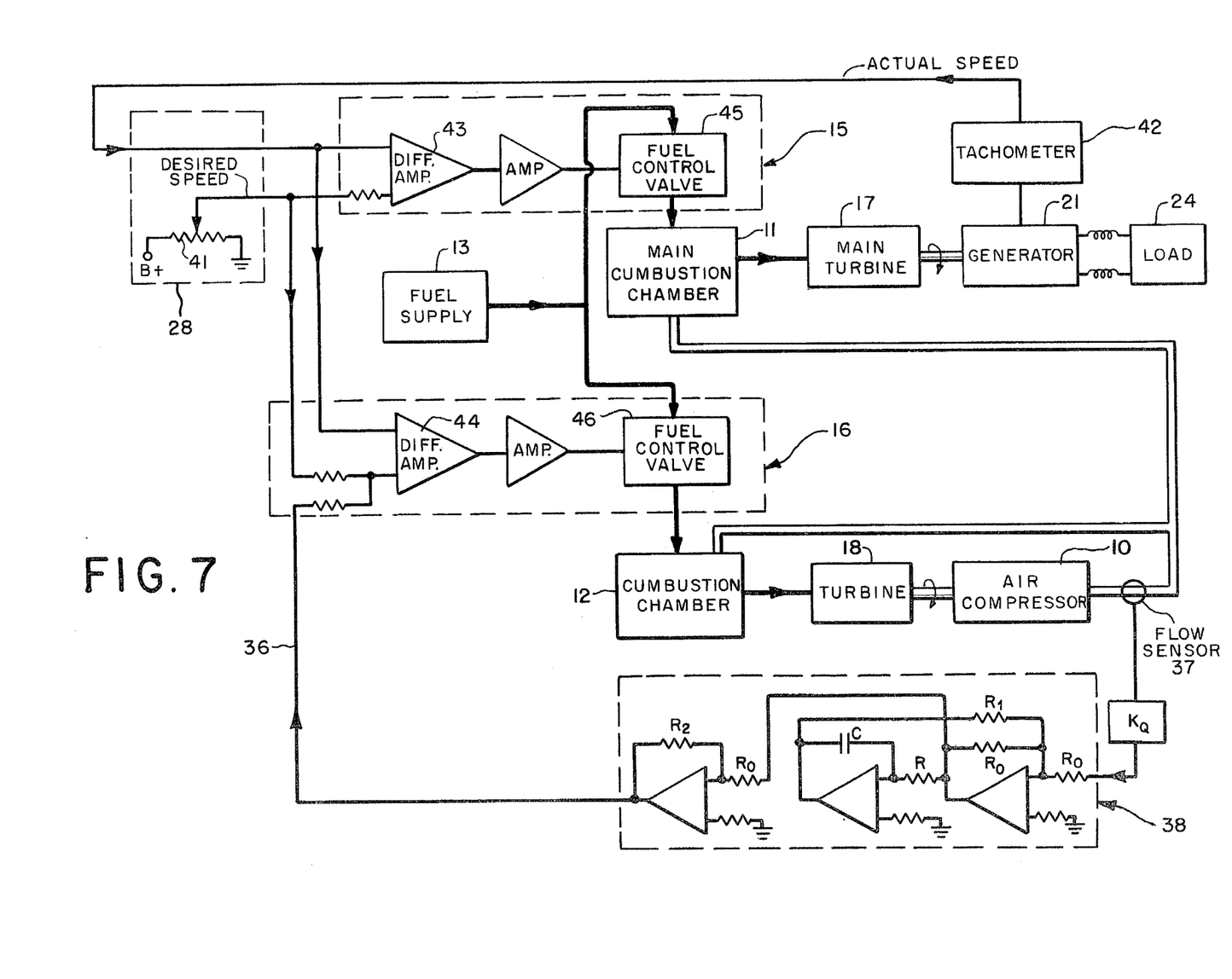
FIG. 7 illustrates the control system of FIG. 5 in greater detail.

To discuss the invention in greater depth, attention is directed to FIG. 7 which is a more detailed illustration of the system of FIG. 5. In particular, FIG. 7 shows the detailed construction of one form that the fuel controllers and the logic circuitry may take. As is apparent, the desired constant speed for generator 21 is established by the adjustment of potentiometer 41, while the actual speed is represented by the signal produced by tachometer 42. Differential amplifiers 43 and 44 respond to the actual speed signal from the tachometer and to the desired speed signal from potentiometer 41 to regulate the fuel control valves 45 and 46 to vary the fuel flow to combustion chambers 11 and 12 as necessary to drive generator 21 at the desired constant speed. At the same time, the speed of compressor 10 is adjusted to establish the flow rate of the compressed air at a steady state operating point on the compressor's pressure-flow characteristic curve.

Figure 8:
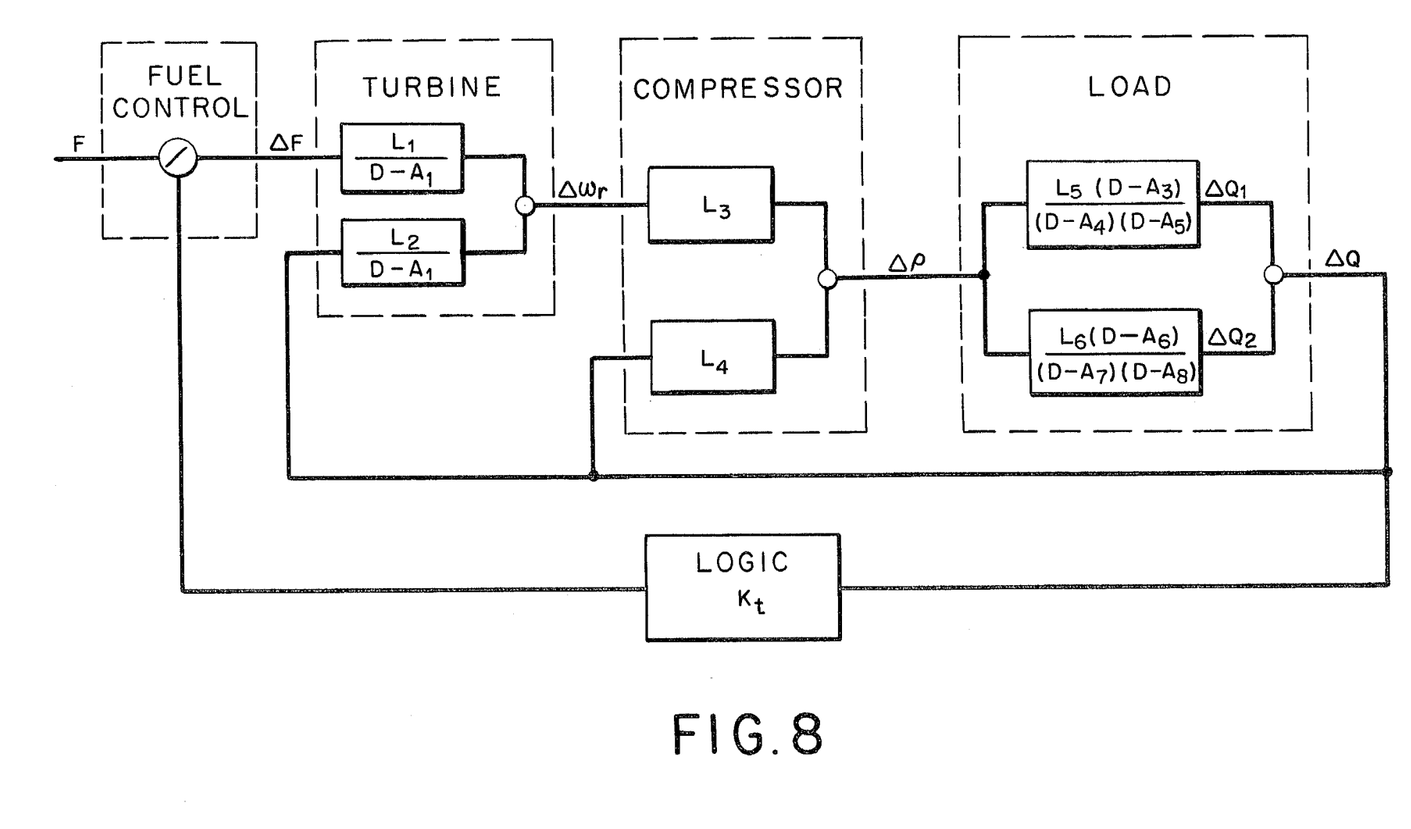
FIG. 8 is a line diagram of the responses to certain variables of the components of the system as illustrated in FIG. 7.

To understand the operation of logic circuitry 38 in FIG. 7, FIG. 8 must be considered which is a line diagram of the responses of the components of the system shown in FIG. 7 to variables such as air flow $\Delta Q$, fuel flow $\Delta F$, changes in turbine speed $\Delta \omega_r$, and pressure changes $\Delta P$. $K_t$ represents the transfer function of the logic that must be determined to maintain stability. The speed of the turbine is affected by load changes $\Delta Q$ and changes in fuel flow $\Delta F$.

Thus on a small signal theory basis:

$$\Delta \omega_r = \frac{\partial \omega_r}{\partial F} \Delta F + \frac{\partial \omega_r}{\partial Q} \Delta Q$$

$$\frac{\delta \omega_r}{\partial F} = \frac{L_1}{D - A_1}$$

$$\frac{\partial \omega_r}{\partial Q} = \frac{L_2}{D - A_1}$$

where D is the operator $d/dt$ and $L_1$, $L_2$, $A_1$ and $A_2$ are constants.

Similarly, the pressure from the compressor $\Delta P$ is a function of speed $\Delta \omega_r$ and flow $\Delta Q$.

$$\Delta P = \frac{\partial P}{\partial \omega_r} \Delta \omega_r + \frac{\partial P}{\partial Q} \Delta Q$$

$$\frac{\partial P}{\partial \omega_r} = L_3$$

$$\frac{\partial P}{\partial Q} = L_4$$

The load on the compressor 10 is made up of the combination of the two combustion chambers in parallel.

$$\Delta Q_1 = \frac{\partial Q_1}{\partial P} \Delta P$$

$$\Delta Q_2 = \frac{\partial Q_2}{\partial P} \Delta P$$

$$\Delta Q = \Delta Q_1 + \Delta Q_2$$

-continued $$\frac{\partial Q_1}{\partial P} = \frac{L_5(D - A_3)}{(D - A_4)(D - A_5)}$$

$$\frac{\partial Q_2}{\partial P} = \frac{L_6(D - A_6)}{(D - A_7)(D - A_8)}$$

Figure 9:
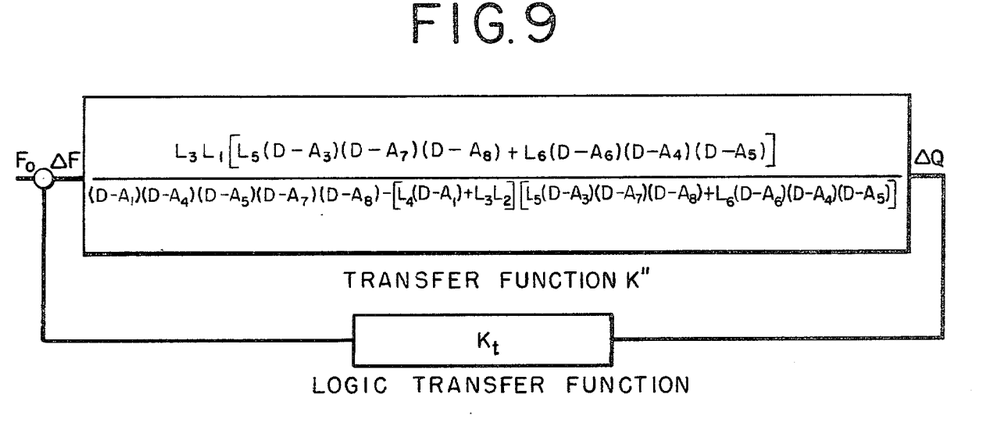
FIG. 9 is a line diagram of a reduction of the line diagram in FIG. 8 to one transfer function.

The expression for the partials ($\partial/\partial$) show different forms; some constant, ($\partial P/\partial \omega_r$, $\partial P/\partial Q$), and some are a complex form of the derivatives D and constants. These forms will be derived later. By combining and eliminating the variables $\Delta \omega_r$ and $\Delta P$, the line diagram shown in FIG. 9 is reached. Thus, it is seen that:

$$\Delta Q = K'' \Delta F$$

and $$\Delta F = \Delta Q K_t$$

$$\therefore 1/K_t = K''$$

This results in an equation involving the constants $L_1$, $L_2$, $L_3$, $L_4$, $L_5$, $L_6$, $A_1$, $A_3$, $A_4$, $A_5$, $A_6$, $A_7$, $A_8$, the differential operator D, and the transfer function "$K_t$". The resulting equation is a fifth order equation. By using the Routh and Routh-Hurwitz criteria for stability (*Handbook of Engineering Fundamentals*, Eschbach, Third Edition, p. 1152), the transfer function "$K_t$" can be determined such that the system is stable. The other method is to solve for the roots of "D" from the equation and assuming various forms for the transfer function "$K_t$" when all of the roots are stable (real portion negative), a stable system will result. This approach can easily be handled by a computer.

An example has been worked out, and is presented later, wherein a single combustion chamber is used. This resulted in a Value of $K_t = DK'$ where K' must be negative and greater than $6 \times 10^{-9}$, resulting in $K_L = -0.922D$. In FIG. 7, this would be accomplished by making $R_0/R_1RC$ large compared to D. This would be equivalent to making $(R_0/R_1RC) >> \omega_0$ the system resonance frequency. The value of $R_1$, $R_2$, $R_0$ and c would be:

| | |
|---|---|
| $R_0$ = 1000 ohms | R = 1000 ohms |
| $R_1$ = 2500 ohms | c = 1μf |
| $R_2$ = 370K ohms | $\omega_0$ = 18.68 (from example) |

The derivation of the constants for the system are as follows:

The power output of the turbine 18 is assumed to be proportional to the flow rate of the input fuel "F". The power from the output shaft is absorbed by the load and the inertia (I) of the turbine and compressor.

For incompressible flow:

$$FK_0 = I/g\, \omega_r \dot{\omega}_r + (P_0 - P_{in})Q$$

Where
 $\omega_r$ is shaft rotational speed.
 $\dot{\omega}_r$ is shaft rotational acceleration.
 g is acceleration of gravity.
 $P_0$ is output pressure from compressor.
 $P_{in}$ is inlet pressure of compressor.
 Q is the flow rate.
 $K_0$ is the proportionality constant between fuel flow and power.

The characteristic curve of the compressor can be represented by $$P_0 - P_{in} = (K_5\omega_r^2 + K_3Q - K_2Q^2)$$

$K_2$, $K_3$ and $K_5$ are constants derived from compressor characteristics.

$$FK_0 = (I/g)\omega_r\dot{\omega}_r + (K_5\omega_r^2 + K_3Q - K_2Q^2)Q$$

In order to see how $\omega_r$ varies as F is varied, it will be assumed that Q is constant and the derivative of both sides will be taken with respect to F, solving for $\partial \omega_r/\partial F$.

$$\frac{\partial \omega_r}{\partial F} = \frac{K_0g/I\omega_r}{D + 2K_5Q_0g/I}$$

Similarly by holding F constant $$\frac{\partial \omega_r}{\partial Q} = \frac{-(2K_3Q_0 - 3K_2Q_0^2 + K_5\omega_r^2)g/I\omega_r}{D + 2K_5Q_0g/I}$$

From the pressure versus flow characteristic described before $$P_0 - P_{in} = K_5\omega_r^2 + K_3Q - K_2Q^2$$

$$\partial P/\partial \omega_r = 2K_5\omega_r$$

$$\partial P/\partial Q = K_3 - 2K_2Q_0$$

Figure 10:
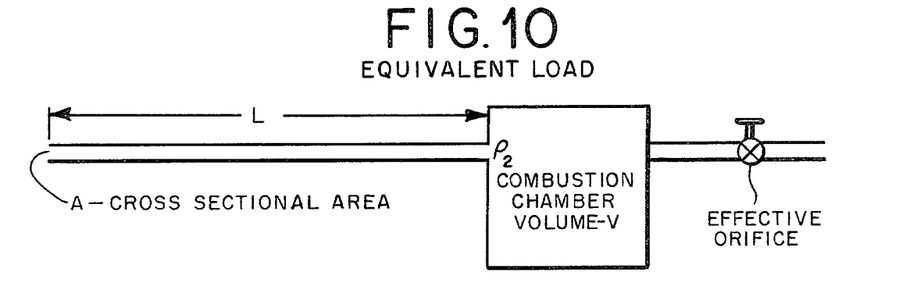
FIG. 10 is a diagram of the equivalent load on the air compressor in a specific example of the control system.

The load on the compressor is the combustion chambers. The equivalent load made up of a length of duct or piping, some volume and flow out of the volume by means of an orifice is shown in FIG. 10. This then results in the following equations $$P_0 = (L/Ag)(dQ/dt) + P_2$$

$$Q - Q_2 = (V/KRT)(dP_2/dt)$$

$$P_2 = (Q_2 - C_0)/C_1$$

The resultant equation for perturbation in pressure from disturbance in flow is $$\Delta P = \frac{L}{Ag} \cdot \frac{D^2 + DC_1KRT/V + AgKRT/LV}{(D + C_1KRT/V)} \Delta Q$$

where
 L is the length of connecting pipe
 $C_1$ is the effective discharge characteristic $Q = C_0 + C_1P$
 K is the ratio of specific heats $C_p/C_v$
 R is the gas content for air 53.35 ft-lbs/lb°R
 A is the cross-sectional air of the connecting pipe
 g is the gravitational constant 32.2 ft/sec$^2$
 T is the absolute temperature of air in the combustion chamber
 V is the volume of the combustion chamber
Therefore $$\frac{\partial Q}{\partial P} = \frac{Ag}{L} \cdot \frac{D + C_1KRT/V}{D^2 + C_1KRT/V + AgKRT/LV}$$

Thus $L_1 = K_0 g / I \omega_r$
$L_2 = -(2K_3 Q_0 - 3K_2 Q_0^2 + K_5 \omega_r^2) g / I \omega_r$
$L_3 = 2K_5 \omega_r$
$L_4 = K_3 - 2K_2 Q_0$
$L_5, L_6 = Ag/L$
$A_1 = -2K_5 Q_0 g / I$
$A_3, A_6 = -C_1 KRT/V$ $$A_4, A_7 = +C_1 KRT/2V + \sqrt{(C_1 KRT/2V)^2 - AgKRT/LV}$$

$$A_5, A_8 = +C_1 KRT/2V - \sqrt{(C_1 KRT/2V)^2 - AgKRT/LV}$$

The example worked out is now presented, the compressor being a Buffalo forge blower, Model 25-1.

$FK_F$ = power from turbine

If F is in gallon/sec and $FK_F$ is in ft #/sec then $K_F$ must be in ft #/gal.
If the fuel is crude oil, the heat of combustion is 150,000 BTU/gal or $1400 \times 10^6$ in #/gal.

$$FK_F = I/g \, \dot{\omega}_r \omega_r + (K_1 \omega_r^2 + K_3 Q - K_2 Q^2) Q + P_L$$

$I \dot{\omega}_r \omega_r / g$ is the inertia load on the system.
$K_1 \omega_r^2 + K_3 Q - K_2 Q^2$ is the pressure drop across to the compressor.
$(K_1 \omega_r^2 + K_3 Q - K_2 Q^2) Q$ is the output power from the compressor.
$P_L$ is the power losses.
Taking the partial with respect to F assuming Q and $\dot{\omega}_r$ constant $$K_F = I/g(D \, \partial \omega_r / \partial F \, \omega_r) + 2K_1 \omega_r Q_0 \, \partial \omega_r / \partial F$$

$$\partial \omega_r / \partial F = \frac{K_F}{I/g(D\omega_r) + 2K_1 Q_0 \omega_r}$$

$$= \frac{K_F g / I \omega_r}{D + 2K_1 Q_0 g / I}$$

Similarly when F and $\dot{\omega}_r$ are assumed constant $$0 = K_1 \omega_r^2 + 2K_3 Q_0 - 3K_2 Q_0^2 + \frac{I}{g} \omega_r \frac{\partial \omega_r}{\partial Q} + 2K_1 Q_0 \omega_r \frac{\delta \omega_r}{\delta Q}$$

$$\frac{\partial \omega_r}{\partial Q} = -\frac{K_1 \omega_r^2 + 2K_3 Q_0 - 3K_2 Q_0^2}{I/g \omega_r D + 2K_1 Q_0 \omega_r}$$

$$= -\frac{(K_1 \omega_r^2 + 2K_3 Q_0 - 3K_2 Q_0^2) g / I \omega_r}{D + 2K_1 Q_0 g / I}$$

From the characteristic pressure curve $$P - P_{in} = K_1 \omega_r^2 + K_3 Q - K_2 Q^2$$

Thus $$\partial P / \partial \omega_r = 2K_1 \omega_r$$

$$\partial P / \partial Q = K_3 - 2K_2 Q_0$$

From FIG. 10

$$P = \frac{Ld}{Ag} DQ + P_2$$

$$Q - Q_2 = \frac{V}{KRTd} DP_2$$

$$P_2 = \frac{Q_2 d}{C_1} - \frac{C_0}{C_1}$$

$$\frac{\partial Q}{\partial P} = Ag/Ld \frac{(D + KRTC_1/V)}{D^2 + DC_1 KRT/V + AgKRT/LV}$$

$L_1 = K_F g / I \omega_r$
$A_1 = -2K_1 Q_0 g / I$
$L_2 = -(K_1 \omega_r^2 + 2K_3 Q_0 - 3K_2 Q_0^2) g / I \omega_r$
$L_3 = 2K_1 \omega_r$
$L_4 = K_3 - 2K_2 Q_0$
$L_5 = Ag/Ld$
$A_3 = -KRTC_1/V$ $$A_4 = -\frac{C_1 KRT}{2V} + \sqrt{\left(\frac{C_1 KRT}{2V}\right)^2 - \frac{AgKRT}{LV}}$$

$$A_5 = -\frac{C_1 KRT}{2V} - \sqrt{\left(\frac{C_1 KRT}{2V}\right)^2 - \frac{AgKRT}{LV}}$$

A load for the compressor is made up of an 8' length, 2" pipe terminated in a tank 7'4" high, 13" in diameter, having a variable valve for an orifice (as shown in FIG. 10).

Figure 11:
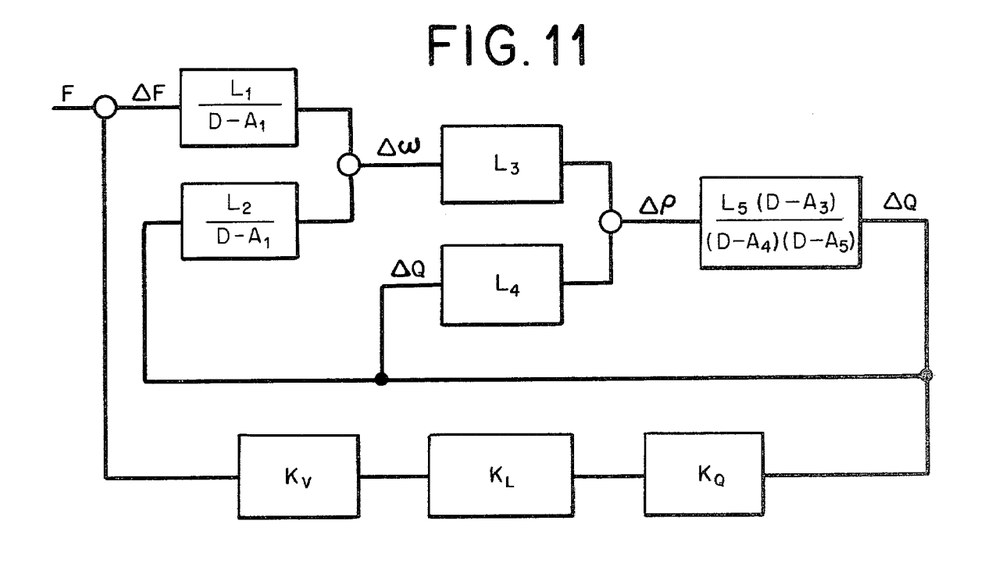
FIG. 11 is a line diagram helpful in explaining the specific example.

$K_1 = 8.24 \times 10^{-6}$ #sec$^2$/in$^2$
$K_2 = 5.66 \times 10^{-9}$ #sec$^2$/in$^8$
$K_3 = 5.23 \times 10^{-5}$ #sec/in$^5$
$L = 144$ in.
$V = 11664$ in$^3$
$A = 3.14$ in$^2$
$R = 640.2$ in/°R
$T = 540°$ R
$g = 386.4$ in/sec$^2$
$K = 1.4$
$I = 2880$ #in$^2$
$K_F = 1400 \times 10^6$ in #/gal
$d = 4.34 \times 10^{-5}$ #/in$^3$
$C_1 = 0.0407$ in$^2$/sec
Operating point:
$W_r = 371.8$ sec$^{-1}$
$Q_o = 2304$ in$^3$/sec
Resulting constants:
$L_1 = 505.2 \times 10^3$ gal$^{-1}$/sec
$L_2 = 4.65 \times 10^{-4}$ in$^{-3}$/sec
$L_3 = 0.00613$ #sec/in$^2$
$L_4 = 2.622 \times 10^{-5}$ #sec/in$^5$
$L_5 = 1.942 \times 10^5$ in$^5$/#sec$^2$
$A_1 = -5.094 \times 10^{-3}$ sec$^{-1}$
$A_3 = -1.689$ sec$^1$
$A_4 = -0.844 + j\, 18.68$
$A_5 = -0.844 - j\, 18.68$
Refering to FIG. 11, $$\Delta Q = \frac{L_5 (D - A_3)}{(D - A_4)(D - A_5)} \left( L_4 \Delta Q + \frac{L_3 L_2}{D - A_1} \Delta Q + \frac{L_3 L_1}{D - A_1} \Delta F \right)$$

$$\Delta Q = \frac{L_1 L_3 L_5 (D - A_3) \Delta F}{(D_4 - A_4)(D - A_5)(D - A_1) - L_5 L_4 (D - A_3)(D - A_1) - L_2 L_3 L_5 (D - A_3)}$$

$\Delta F = K_t \Delta Q, \, K_t = K_r K_L K_Q$

Where $K_r$, $K_L$, $K_Q$ are the fuel valve, logic and flow sensor transfer function respectively.

$(D - A_4)(D - A_5)(D - A_1) - L_4L_5(D - A_3)(D - A_1) - L_2L_3L_5(D - A_3) = L_1L_3L_5(D - A_3)K_t$ $D^3 - D^2(A_1 + A_4 + A_5 + L_4L_5) + D(A_4A_5 + A_4A_1 + A_5A_1 + L_4L_5A_3 + L_4L_5A_1$
$- L_2L_3L_5 - L_1L_3L_5K_t) - A_1A_4A_5 - L_4L_5A_1A_3 + L_2L_3L_5A_3 + L_1L_3L_5A_3K_t = 0$ $A_1 + A_4 + A_5 + L_4L_5 = 3.398$ $A_4A_5 + A_4A_1 + A_1A_5 + L_4L_5(A_3 + A_1) - L_2L_3L_5 - L_1L_3L_5K_LK_VK_Q$
$= 340.5 - 601 \times 10^6 K_t$ Units of $K_Q$ are volt sec/in$^3$ = $1.085 \times 10^{-3}$ volts sec/in$^3$
Units of $K_V$ are gal/sec volt = $6.0 \times 10^{-6}$ gal/sec volt
Units of $K_L$ are volt/volt $-A_1A_4A_5 - L_4L_5A_1A_3 + L_2L_3L_5A_3 + L_1L_3L_5A_3K_t = .802 - 1.02 \times 10^9 K_t$ $D^3 - D^2(3.398) + D(340.5 - 601 \times 10^6 K_t) + .802 - 1.02 \times 10^9 K_t = 0$ If $K_t = DK''$ $D^3 + D^2(-3.398 - 601 \times 10^6 K') + D(304.5 - 1.02 \times 10^9 K') + .802 = 0$ If K' is negative and greater than $6 \times 10^{-9}$ the logic transfer function for the system will be stable.

$K_L = -0.922D$

Assuming $K' = -10^{-8}$ $D^3 + 2.61 D^2 + 350.7D + 0.802 = 0$

The roots are $D_1 = -0.002287$ $D_{2,3} = -1.304 \pm j\,18.68$

In this particular system the fuel flow, assuming 100% efficiency, would be for full load $Q_0 = 9216$ in$^3$/sec
$P_0 - P_{in} = .9606$ #/in$^2$
$F_0 = \dfrac{Q_0(P_0 - P_{in})}{K_F} = 6.323 \times 10^{-6}$ gal/sec If a noise signal in the flow is designated as $\Delta Q_n = \overline{\Delta Q_n} \sin \omega_n t$ where $\omega_n$ is assumed to be the resonant frequency of the system $\omega_n = 18.68$ hzs If $\overline{\Delta Q_n}$ is 5% of the operating point $Q_o$ (2304)

$\overline{\Delta Q_n} = 115$ in$^3$/sec

The fuel flow is $\Delta F = K'D\Delta Q = K'D\Delta Q_n = K'\omega_n \overline{Q_n} \cos \omega_n t$ $\Delta F_m = K'\omega_n \overline{Q_n} = 2.15 \times 10^{-5}$ gal/sec $\dfrac{\Delta F_m}{F_0} = 3.40$ This amount of excess power is needed in order to bring a turbine up to speed in a reasonable amount of time.

It will now be appreciated that surge suppression is achieved with minimum energy consumption. This is in sharp contrast with the prior air compressors wherein some energy-dissipating mechanism, such as prerotation guide vanes, must be employed to prevent the system from surging. In this connection, it is to be particularly noted that the active dynamic control of surge, taught in the present application, results in substantial cost savings since no expensive passive mechanical mechanisms are needed in the surge control system.

While a particular embodiment of the invention has been shown and described, modifications may be made, and it is intended in the appended claims to cover all such modifications as may fall within the true spirit and scope of the invention.

I claim:

1. Control apparatus for dynamically controlling surge in a system wherein an air compressor drives a variable load and wherein compressed air from the compressor is supplied, along with fuel, to a combustion chamber to produce hot gas for driving a turbine which in turn rotates the compressor, the discharge pressure of the compressed air at the compressor outlet varying as a function of the discharge flow rate, the discharge pressure versus flow rate plot being divided into surge and non-surge regions, comprising:
   load responsive means for adjusting the fuel flow to the combustion chamber to vary the compressor speed to establish the flow rate of the compressed air at the steady state operating point needed to satisfy the load demand, the operating point being in either the surge or non-surge region of the pressure-flow plot depending on the load demand;
   sensing means for sensing a predetermined parameter which is subject to substantial variations if surging occurs;
   means, responsive to said sensing means, for developing a feedback signal which is a function of said predetermined parameter;
   and regulating means responsive to said feedback signal for varying the fuel flow to the combustion chamber to dynamically change the speed of the compressor to vary the instantaneous operating point, on the compressor's discharge pressure versus flow rate characteristic curve, alternately back and forth around the steady state operating point and to impart a negative slope to the portion of the pressure-flow characteristic curve over which the instantaneous operating point dynamically varies, thereby preventing surge and stabilizing the operation of the system even when the steady state operating point lies within the surge region of the pressure-flow plot.

2. Control apparatus according to claim 1 wherein said predetermined parameter is the instantaneous flow rate of the compressed air at the discharge outlet of the air compressor.

3. Control apparatus according to claim 1 wherein the variable load includes a main combustion chamber to which compressed air from the air compressor is supplied, along with fuel, to product hot gas for driving a main turbine, the main combustion chamber and main turbine being different from the combustion chamber and turbine that drive the compressor.

4. Control apparatus according to claim 3 wherein said load responsive means adjusts the fuel flow to the main combustion chamber to vary the speed of the main turbine as necessary to meet the load requirements.

5. Control apparatus according to claim 3 wherein the variable load includes rotating machinery driven by the main turbine, said load responsive means being responsive to an operating characteristic of the rotating machinery.

6. Control apparatus according to claim 5 wherein the rotating machinery is a generator and said load responsive means responds to the generator's speed.

7. Control apparatus for dynamically controlling surge in a system wherein an air compressor drives a variable load and wherein compressed air from the compressor is supplied, along with fuel, to a combustion chamber to produce hot gas for driving a turbine which in turn rotates the compressor, the discharge pressure of the compressed air at the compressor outlet varying as a function of the discharge flow rate, the discharge pressure versus flow rate plot being divided into surge and non-surge regions, comprising:

sensing means for sensing a predetermined parameter which is subject to substantial variations if surging occurs;

means, responsive to said sensing means, for developing a feedback signal which is a function of said predetermined parameter;

and regulating means responsive to said feedback signal for varying the fuel flow to the combustion chamber to dynamically change the speed of the compressor to vary the instantaneous operating point, on the compressor's discharge pressure versus flow rate characteristic curve, alternately back and forth around a steady state operating point and to impart a negative slope to the portion of the pressure-flow characteristic curve over which the instantaneous operating point dynamically varies, thereby preventing surge and stabilizing the operation of the system even when the steady state operating point lies within the surge region of the pressure-flow plot.

8. Surge control apparatus for preventing surge in a system wherein air flows through a containment circuit including a variable speed air compressor, comprising:

means, including a flow sensor at the compressor outlet, for developing a signal which is a function of the discharge flow rate of the compressed air at the compressor outlet;

and means responsive to said signal for dynamically varying the speed of the air compressor back and forth around a static operating point to change the compressor's capacity and to impart a negative slope to the portion of the compressor's pressure-flow characteristic curve over which the instantaneous point dynamically varies, thereby preventing surge and stabilizing the operation of the system even when the static operating point lies within what is normally called the surge region of the pressure-flow plot.

* * * * *

UNITED STATES PATENT AND TRADEMARK OFFICE
CERTIFICATE OF CORRECTION

PATENT NO. : 4,309,871
DATED : January 12, 1982
INVENTOR(S) : HARRY JAMES VENEMA It is certified that error appears in the above—identified patent and that said Letters Patent is hereby corrected as shown below:

Column 12, line 63, cancel "product" and insert -- produce --

Signed and Sealed this

Sixth Day of April 1982

[SEAL]

Attest:

GERALD J. MOSSINGHOFF

*Attesting Officer*    *Commissioner of Patents and Trademarks*